United States Patent [19]

Dixon

[11] 4,053,944
[45] Oct. 11, 1977

[54] MICROPROCESSOR CONTROLLED SIGNAL PATTERN DETECTOR

[75] Inventor: Jerry Duane Dixon, Boca Raton, Fla.

[73] Assignee: International Business Machines Corporation, Armonk, N.Y.

[21] Appl. No.: 682,225

[22] Filed: Apr. 30, 1976

[51] Int. Cl.$^2$ .......................... G06F 1/04; G06F 13/04
[52] U.S. Cl. ........................................ 364/200; 360/51
[58] Field of Search .................... 340/172.5; 445/1; 364/200, 900; 360/51

[56] References Cited

U.S. PATENT DOCUMENTS

| | | | |
|---|---|---|---|
| 3,753,232 | 8/1973 | Sporer | 340/172.5 |
| 3,997,876 | 12/1976 | Frush | 364/200 |

*Primary Examiner*—Melvin B. Chapnick
*Attorney, Agent, or Firm*—Robert W. Berray

[57] ABSTRACT

Signals generated by double frequency magnetic recording are received by logic which is controlled, and sensed, by a sequence of program instructions from a microprocessor. In particular, a special pattern of signals is to be recognized. The special pattern of signals is known in the magnetic disc recording art as an address mark which is a unique pattern of interspersed clock signals and data signals. The pattern is made more unique from any other pattern of data by the fact that certain of the clock signals are missing. The ability to utilize a microprocessor, which is relatively slow, in a magnetic recording system in which the bit rate is relatively fast, is enhanced by a particular processor program instruction which is effective to access a next following instruction from program storage and then stop the clock of the processor. The clock is re-started, and therefore execution of the next instruction initiated, upon receipt of a timing signal from the logic receiving the signals to be detected.

7 Claims, 3 Drawing Figures

MICROPROCESSOR CONTROLLED SIGNAL PATTERN DETECTOR

BACKGROUND OF THE INVENTION

The present invention relates to signal sensing for the purpose of detecting a special pattern of signals, and more particularly to utilization of a programmed processor for sensing and detecting a special pattern.

In magnetic recording, and in particular magnetic recording on disc files, a double frequency recording technique is utilized. Double frequency recording involves the recording of magnetic flux transitions at a clock frequency, with binary data being represented by the presence or absence of a flux transition between clock flux transitions. This form of recording provides a means by which a variable frequency oscillator (VFO) can be made responsive to reproduced signals from the magnetic recording to synchronize and control the sampling of the recorded data.

In magnetic disc recordings, each track is normally divided into a number of sectors, with each sector being comprised of various identifying and control characters for the purpose of data detection within the sector. One item of control information for the purpose of controlling further reproduction, is a field called an address mark. The fixed data content of an address mark field identifies the type of field which follows the address mark. The file control unit is caused to search for this particular data combination to control the use of the subsequent identified information. Since other portions of the recorded information may include normal data having the same data content as the address mark field being sought, a further form of signal detection has been incorporated into the detection of the particular data field. Address marks incorporate a special form of magnetic recording in which the binary data is interspersed with normal clock periods. However, instead of there being a magnetic flux transition for each clock period, certain flux transitions at clock times are eliminated from the recording. Therefore, a magnetic disc file control unit will recognize, with certainty, detection of the address mark, when the unique pattern of data is detected, along with the unique pattern of clocks and missing clocks within the eight-bit character being sensed.

Because of the high frequency at which the data and clock signals must be detected, previous file control units have required special purpose hardware and logic utilized only for this purpose. Even when magnetic disc file control units have been implemented utilizing programmed mini or microprocessors, the special purpose hardware has had to be included because the processors did not have the speed and instruction power necessary to operate at the high speed.

It is therefore the object of the present invention to provide a program controlled microprocessor, with simple circuitry, suitable for detecting the data and clock sequence of address marks.

SUMMARY OF THE INVENTION

The present invention includes a minimum amount of additional circuitry in both a magnetic disc file control unit which recieves signals from a double frequency recorded magnetic disc file for the purpose of generating clock and data signals in accordance with double frequency reproducing techniques, and a stored program microprocessor. The programmed microprocessor used for sensing data and clock signals, includes among the controlling instructions for the processor, a sense instruction which will issue a sense command, out instruction which will issue an output command, branch on zero, branch on non-zero, and a branch and wait instruction. In the absence of the branch and wait instruction to be described, the previously listed instructions could be utilized for the purpose of sensing for the clocks, missing clocks, and data, but under certain situations could not be executed at a high enough rate to insure proper sensing operations. Execution of the branch and wait instruction in the microprocessor, has the effect of addressing and reading out from the program instructions in storage, the next instruction identified by the address information in the instruction. When access of the next instruction has been completed, the branch and wait instruction will be effective to stop the processor clock, preventing the initiation of execution of the instruction just accessed. Timing signals created in the data and clock sensing circuitry of the file control unit will be effective to re-start the processor clock to initiate execution of the instruction previously accessed, thereby providing immediate synchronization of the microprocessor to the signals being sensed.

DESCRIPTION OF PREFERRED EMBODIMENT

Figure 1:
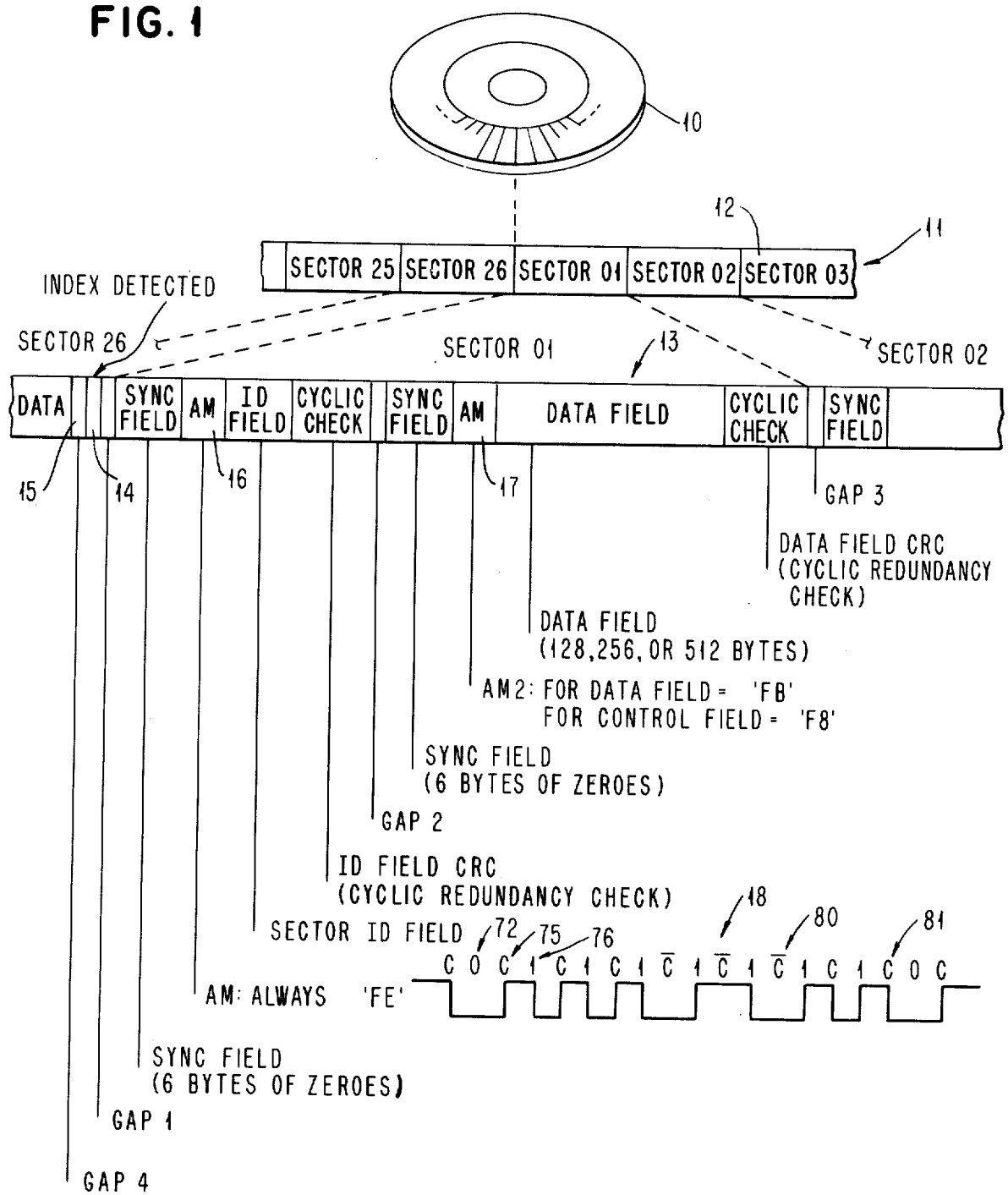
FIG. 1 is a representation of the format of magnetic recordings on a magnetic disc.

In FIG. 1 there is shown a magnetically recorded disc 10 which is comprised of a plurality of recording tracks 11, each of which can be divided into a plurality of sectors 12. The format of each of the sectors 12 is as represented at 13.

On each of the recording tracks 11, there will be an index mark 14 preceded by a gap 15 signifying the start of sector 1. The recorded portions labeled "GAP" are utilized for synchronization for following data. The first significant field of a sector is the sync field which is comprised of 6 bytes (8-binary bits) of recorded binary zeroes. The sync field is utilized for providing an initial indication that the next following field is probably going to be the address mark field 16 and synchronizes the detection circuitry. The addresss mark field 16 preceeds several bytes of encoded binary data called the ID field which is the identity of the sector to be compared with the identity of a sector being sought. The cyclic check field is an error detection code field for the ID field. The next following sync field preceeds another address mark field 17 which is coded with data identifying the next following field as a data field (FB) or a control field (F8). The next cyclic check field following the data field is another cyclic redundancy check field generated for the previous data field. Gap 3 signals the end of the first sector.

To save time in searching for a particular sector, once the file control unit has received the identification of the sector required, an immediate search will begin for locating, and matching, the ID field. Since any of the information recorded on a particular track can take many forms, it is possible that a character detected in a data field or any other field, may in fact match the coded identification of the ID field of the sector being sought. Therefore, the file control unit must be informed of the exact location of the magnetic reproducing head to insure that the information being sensed is in fact the ID field of any sector. The technique for insuring that the ID field is being detected requires that it be preceded by the address mark field 16, which in turn is preceded by the sync field consisting of 6 bytes of zeros. Again, since many different forms of data can be recorded, it is conceivable that a data field might be comprised of 6 bytes of binary zeros followed by coded data which would be identical to the data in the address mark field 16, and also be followed by data that could conceivably match the coded data of the ID field.

To provide absolute assurance that the sync field, address mark field 16, and ID field are being sensed, the address mark field 16 is not only coded with a particular binary data sequence, but normally occurring magnetic flux transitions at clock times are skipped, or caused to be missing. Therefore, it is a feature of the present invention that there is provided circuitry necessary for first detecting a sequence of binary zeros in the sync field, followed by detection of the data in the address mark field, along with a pattern of clock signals and missing clock signals.

The representation shown at 18 is the magnetic flux transistions recorded on the magnetic disc to delineate the address mark field 16. As previously mentioned, double frequency magnetic recording is utilized and represented at 18. The representation "C" identifies flux transitions at clock periods. The symbol C indicates a missing clock. In double frequency recording, detection of frequency "F" occurs when adjacent clock signals are detected without an intervening signal, and represents a binary zero. When flux transitions occur at a frequency "2F" a flux transition has occurred between two clock flux transitions and represents a binary 1.

As represented at 13, two address mark fields 16 and 17 are shown. The data coding of the first address mark field 16 is shown at 18, and is comprised of the hexidecimal binary coding FE, which in binary form is represented by 11111110. The representation FE identifies the address mark preceding an ID field. The second address mark field 17 may precede a data field and is therefore encoded with hexidecimal FB, and when the second address mark field 17 precedes a field containing control information, it will be encoded F8.

A limitation on utilizing clocks and missing clock signals for address mark detection requires that if there are missing clock signals, a binary 1 must be recorded on either side of the missing clock period to maintain the variable frequency oscillator in synch.

Figure 2:
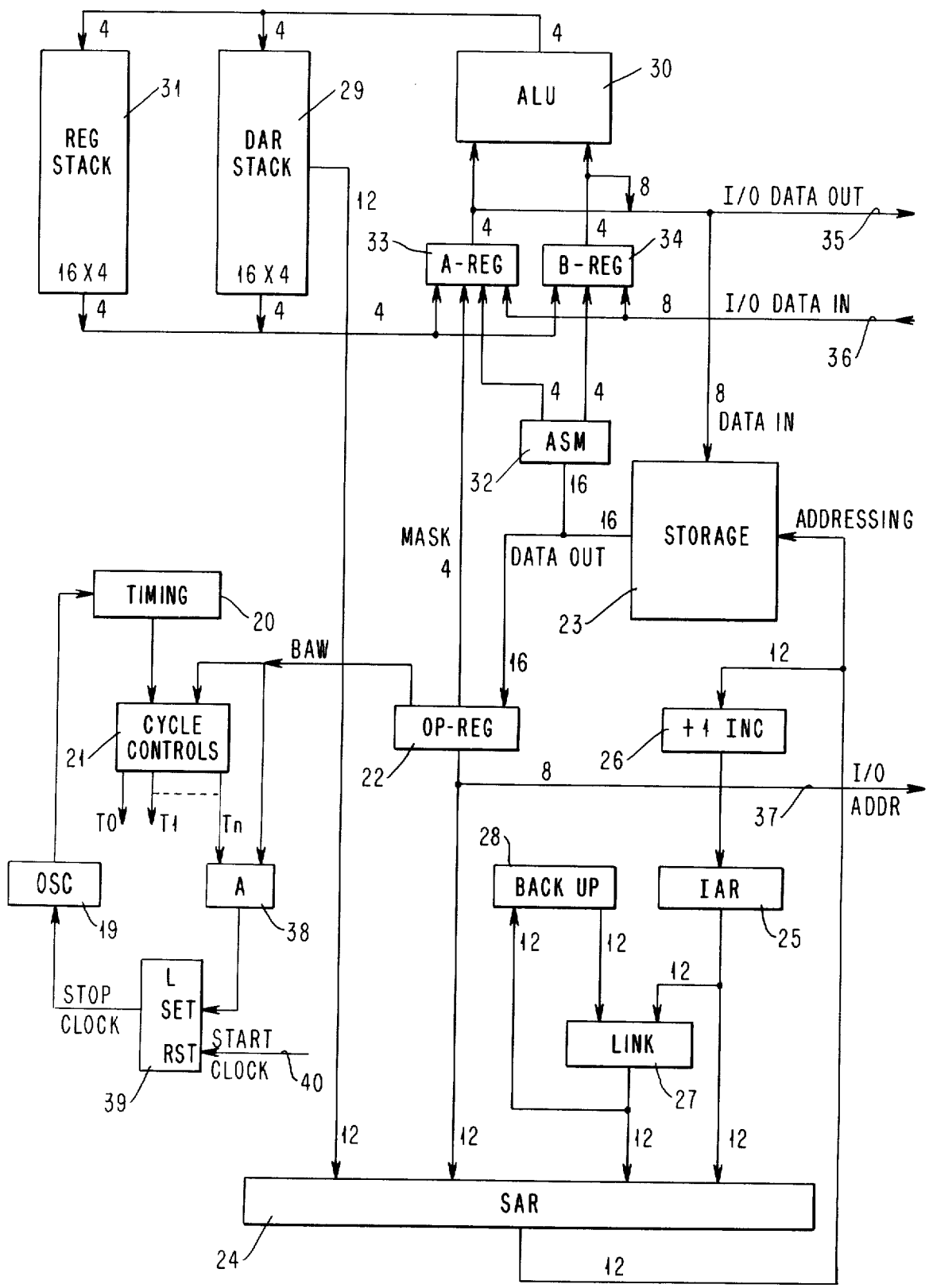
FIG. 2 is a block diagram of the data flow of a programmed microprocessor utilized in the present invention.

FIG. 2 is a block diagram of the major parts of a microprocessor utilized in the present invention. Basic clock control of the processor is by an oscillator 19 which timing pulse generator 20 which establishes the basic frequency of the processor, the output of which is applied to cycle controls 21 which provides a number of control signals T0, T1, through Tn. Signal Tn signals the end of execution of a program instruction contained in an Op register and decoder 22. Storage 23 contains data, a sequence of program instructions, and other control information. The addressing of data or program instructions from storage 23 is under control of a storage address register 24. Storage address register 24 receives 12 binary bits of address information from several sources including an instruction address register 25 which, in response to a +1 incrementor 26, is effective to provide access to sequential instructions from storage 23 for transfer to the Op register 22.

Instead of accessing the next sequential instruction utilizing instruction address register 25, branch instructions decoded in Op register 22 will cause address information to be inserted into the storage address register 24, to cause access to an instruction other than the one next in sequence. To permit branching to instructions in a new sequence, and return to a prior sequence, a link register 27 and backup register 28 are provided. Another source of address information are addressable registers called data address register (DAR) stack 29.

The data path within the processor includes an arithmatic and logic unit 30, the output of which may be presented to a data register stack 31. Data from storage 23 will be transferred through an assembler 32 to an A register 33 or B register 34. Registers 33 and 34 may be addressed by program instructions for the purpose of presenting 8 binary bits to an I/O data out bus 35, or can also be addressed to receive data on an I/O data in bus 36. The decode of I/O instructions in Op register 22 cause 8 binary bits to be presented to an I/O address bus 37. The 8 binary bits of address information on bus 37 can be decoded in other devices, such as a file control unit, in such a way that the information on the I/O address bus 37 can be utilized to identify particular registers, latches, or even individual logic circuits for the purpose of control or sensing by the processor.

A particular program instruction, essential for address mark detection utilizing the processor, is an instruction called branch and wait (BAW). When this instruction is decoded in the Op register 22, it will be effective to enable an AND circuit 38 which responds to the final control signal Tn of the branch and wait instruction to set a latch 39 effective to stop the clock 19. Latch 39 will be reset by a signal on start clock line 40 received from logic circuitry in the disc file control unit, to be more fully discussed. Prior to setting the latch 39 in response to the BAW instruction, other control signals will have been effective to utilize the address portion of the BAW instruction in the Op register 22, through the storage address register 24, to access from storage 23 the program instruction identified in the BAW instruction. This instruction will be available at the output of storage 23 at the time latch 39 is set stopping the clock. When the start clock signal 40 is received at latch 39, the clock 19 will be started, the instruction will be loaded into op register 22, and execution of the instruction will be commenced.

Figure 3:
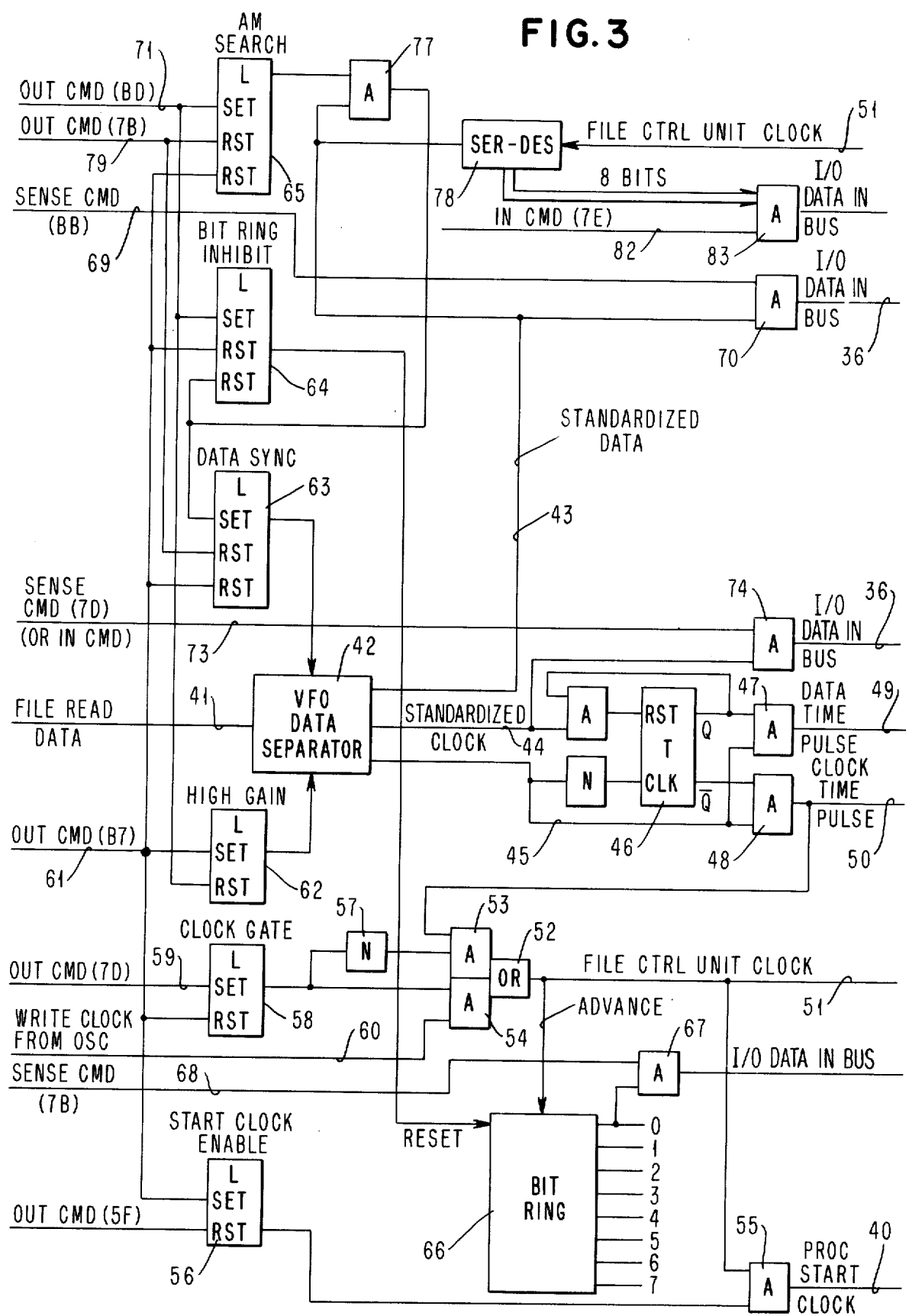
FIG. 3 shows the logic included in a disc file control unit utilized for purposes of address mark detection.

FIG. 3 shows some of the logic in a magnetic disc file control unit which is controlled and sensed by program instructions from the processor. The two basic commands to the logic, decoded by instructions in the Op register 22 of FIG. 2, are the out command and sense command. With each of these basic commands, on certain signal lines yet to be discussed, there is a hexidecimal representation of the information on the address bus 37. The eight binary bits on the address bus 37 from the processor will be decoded and identify particular latches, or AND gates, to be controlled or sensed respectively.

In FIG. 3, the reproduced magnetic information comprised of a sequence of clock and data signals is received on a file read data line 41. In accordance with well known double frequency magnetic recording techniques, the sequence of clock and data signals are utilized in a variable frequency oscillator (VFO) 42 to provide self-timing for the purpose of separating the signals received on line 41 into standardized data signals on a line 43, and a standardized clock on line 44. Variable frequency oscillator 42 functions in such a way that the combination of clock signals and data signals provides synchronization. Should a long series of data signals be missing, or in accordance with the present invention, clock signals be missing, a fly-wheel affect is achieved. That is, clock signals will continue to be produced at the frequency and phase established before the start of missing data or clock pulses on line 41. Signals produced on a line 45 are a series of pulses, each corresponding to a data pulse time or clock pulse time, and are at a frequency based on previous control exercised by clock and data signals received on line 41. A trigger 46 will be set and reset utilizing the standardized clock 44 and signals on line 45 to produce, at AND circuits 47 and 48, data time pulses on line 49, and clock time pulses on line 50 respectively. This provides immediate phase locking between clock and data time pulses on line 49 and 50 on the first occurrence of a standardized clock on line 44.

Many forms of VFO data separators are available. Two prior such circuits, utilized to separate data and clock pulses, and provide detection of missing clock pulses, are shown in commonly assigned U.S. Pat. No. 3,382,492 by G. R. Santana and issued May 7, 1968, and U.S. Pat. No. 3,418,585 by W. T. Harnett and issued Dec. 24, 1968.

A file control clock is produced on a line 51 from the output of an OR circuit 52 which receives inputs from an AND circuit 53 or AND circuit 54. The file control unit clock 51 is utilized in other circuitry of the magnetic disc file control unit. The control clock 51 is effective, when an AND circuit 55 is enabled by latch 56, to produce the signal on line 40 of FIG. 2 which is effective to start the clock 19 of the processor. Latch 56 will normally be in the reset condition, thereby disabling AND circuit 55 from producing the start processor clock signal on line 40.

In the present invention, when the address mark is being sensed, AND circuit 53 will be enabled through an inverter 57 when a clock gate latch 58 is in the reset condition. Latch 58 will be set by a signal on line 59 from the processor when the file control unit is being utilized to write data on the magnetic disc. When latch 58 is in the set condition, pulses from a basic oscillator on line 60 will be passed through AND circuit 54 to provide the basic control clock signal 51. This will be the clock utilized in the system for the purpose of writing information on the magnetic disc.

Prior to the time the logic shown in FIG. 3 becomes effective, the file control unit incorporating the programmed processor would have been instructed to search for the sector ID field on a particular track for the purpose of comparison with the desired sector ID presented to the file control unit. The programmed processor will include a program sequence of instructions utilized primarily for comparing the detected ID field from the magnetic disc with the ID field requested. However, one of the first instructions in that sequence will cause the processor to branch from the program concerned with ID field matching to the sequence of instructions utilized in connection with FIG. 3 for the purpose of searching for the address mark field associated with ID fields.

The first program instruction encountered by the processor for the purpose of initiating the search for the address mark field 16 associated with an ID field, is an out command received on line 61. The parenthetical expression (B7) represents the hexidecimal coding contained on the address bus 37 from the processor.

In response to the signal on line 61, a number of latches are set and reset and these include the previously mentioned start clock enable latch 56 and clock gate latch 58 which, respectively, enable AND circuit 55 and AND circuit 53. This enables the file control unit clock 51 to be generated and synchronized with signals received on line 41, and permit the required starting of the processor clock 19 on line 40 during the address mark detection period.

Further latches affected by the signal on line 61 include a high gain latch 62, data sync latch 63, bit ring inhibit latch 64, and address mark (AM) search latch 65. The execution of the out command on line 61 places the logic in FIG. 3 in readiness for responding to further instructions from the processor for detecting the sequence of data, clocks, and missing clocks which comprise the address mark. This has the effect, through operation of the high gain latch 62, data sync latch 63, and bit ring inhibit latch 64, of causing the processor to respond to, and sense the sync field of binary 0's which precedes the address mark field 16 in each data sector. The sync field, as shown in FIG. 1, is comprised of six bytes of binary 0's which, in accordance with the double frequency recording technique, provide a sequence of pulses only in response to flux transitions representing clock periods. The function of the high gain latch 62 is to control the VFO data separator 42 to, as quickly as possible, synchronize with the clock signals being received on line 41. The VFO 42 responds to the reset condition of the data sync latch 63 by recognizing the fact that there will not be any binary 1 signals recieved on line 41 for the purpose of aiding in synchronization.

The bit ring inhibit latch 64 output controls a bit ring 66 which has eight positions corresponding to the eight binary bits which comprise a one-byte character recorded on the disc file. To be more fully discussed, an AND circuit 67 is provided to respond when the bit ring is in position 0, and is sensed by a signal on line 68.

As part of the search for the address mark field 16, a sequence of instructions in the processor includes one instruction identified as the sense command (BB) which generates a signal on a line 69, effective at an AND circuit 70 to present to the processor on the data bus in 36, the state of the data signals sensed, whether binary 1's or 0's. The processor program sequence is such that prior to rendering the logic in FIG. 3 effective for address mark detection, at least 16 binary zeros from the preceding sync field must be received. Since the data field in any particular sector could also have recorded therein a large sequence of binary zeros, during the sequence of searching for at least 16 binary zeros, should a binary one be detected indicating that the sensing head is not within the sync field, the search for 16 binary zeros in succession will be reinitiated.

If at any time 15 binary zeros have been detected, a processor instruction labeled out command (BD) on line 71 will be generated. The signal on line 71 will be effective to set the AM search latch 65, bit ring inhibit latch 64, and reset the high gain latch 62. When the bit ring inhibit latch 64 is set, the bit ring 66 will be reset to position seven in readiness for receiving the eight binary bits of the address mark coded data sequence. Further, the high gain latch 62 is reset in preparation for causing the VFO 42 to respond normally to received signals on line 41.

When the processor has sampled a 16th binary zero in sequence, such as the one shown at 72 in FIG. 1, a sense command (7D) on line 73 will sample AND circuit 74 which receives the standardized clock signal on line 44 for presentation to the processor on the data bus in 36. This represents, if the reproducing head is in fact reading the clock shown at 75 of FIG. 1, that this is the beginning of the address mark sequence. Otherwise, the binary zero detected by AND circuit 74 will be saved and the logic shown in FIG. 3 will be in readiness for recognizing the first binary one shown at 76 in FIG. 1. Sixteen binary zeros could have been detected very early in the sync field preceding the address mark 16. This readies the circuitry of FIG. 3 for detection of the first data signal 76 of the address mark field 16.

When the first binary one shown at 76 of FIG. 1 is detected on line 43 of FIG. 3, AND circuit 77 will produce an output which resets the bit ring inhibit latch 64, and sets the data sync latch 63. The bit ring 66 will therefore be advanced to count zero, detected by AND 67, and the binary bits of the data portion of the address mark field 16 will be sensed. To ensure that the data portion of the address mark is properly accumulated, the bit ring 66 must be in character synchronization which is sampled by the AND circuit 67 before the bit ring 66 is allowed to proceed. The bit ring 66 steps through positions 0-7 to control various functions in the file control unit. Position 7 indicates that 8-bits of a character have been accumulated in a serializer-deserializer 78. The data sync latch 63 being set by the first binary one 76 of the address mark data portion has the effect of causing the VFO data separator 42 to synchronize on the data signals being received on line 41, and ignore any missing clock signals on line 41 in view of the fact that the sequence of pulse signals on 41 may now include missing clock signals.

The eight binary bits representing the data portion of the address mark, that is the sequence of binary ones and zeros will be accumulated in the eight-bit serializer-deserializer (SER-DES) 78 which is a part of the file control unit. The data portion of the address mark, as presented on line 43 will be accumulated in the serializer-deserializer 78.

As the data portion of the address mark is being accumulated, a series of sense commands (7D) on line 73 will sample AND circuit 74 to present to the processor on data bus in 36, the state of the clock signals received. The processor instruction sequence for sensing clocks or missing clocks, testing the state of the clocks, and proceeding with the address mark detection, or reinitiating the detection requires a basic sequence of instructions. The sequence includes use of the previously mentioned branch and wait instruction, the sense command shown on line 73, and a branch instruction which tests the state of the clock signal sensed as presented on data bus in 36 from AND circuit 74. The testing of the state of the clock signal sensed at AND circuit 74 is done by a branch instruction which is effective to cause a next sequential instruction to be accessed from the processor storage 23 if the state of the clock signal sensed is proper in accordance with the format shown at 18 in FIG. 1. If the state of the clock signal sensed is not proper in accordance with the sequence shown at 18, the branch instruction is effective to cause the program sequence to return to the instruction which, when decoded, produces the signal on line 61. This will be effective to reset the logic of FIG. 3, and the program sequence of the processor, to reinitiate a search for the preceding sync field and, therefore, address mark field 16.

As the proper sensing of the sequence of clocks and missing clock signal proceeds, a processor instruction will be executed to produce a signal on a line 79 to indicate that the detection has proceeded to the point indicated at 80 of FIG. 1, and will be effective to reset the address mark search latch 65 and data synch latch 63. The program sequence will proceed as previously mentioned, but the data synch latch 63 being reset will be effective to control the VFO data separator 42 to recognize that it should now begin using clock transitions to synchronize, instead of data transitions, since clock signals will now be present on the line 41 in accordance with the showing at 18 in FIG. 1.

As the processor program sequence proceeds in response to receipt of the correct state of clock and missing clock signals on line 41, there will be one final test of the state of the clock and missing clock sequence which tests the clock shown at 81. If proper, the proper sequence of clocks and missing clocks of the address mark have been received. At this time, a final check of a proper address mark detection is made by generating a signal on line 82 for rendering effective an AND circuit 83 to transfer the data received and stored in the serial-deserializer 78 to the processor for comparison with the expected data content FE, indicating the address mark detected was in fact associated with an ID field. When this final check has been made, the program sequence will return to the original sequence that was entered for ID field comparison.

For each clock signal to be sensed and tested, there is a group of three program instructions accessed from storage 23 in the processor. The first instruction in each sequence is a branch and wait instruction which stops the oscillator 19 in FIG. 2 after access of the second instruction of the sequence utilized for sensing the state of the clock signal. The instruction which senses the clocks or missing clocks will be rendered effective when the file control clock 51 is generated to enable AND circuit 55 of FIG. 3 to produce the start clock signal 40. The sense instruction will be executed to store an indication of the state of the clock or missing clock received on line 41. The third instruction in each of these sequences is the branch on clock condition instruction which, when the state of the clock is as expected by the branch instruction, will cause the next instruction in sequence to be accessed. This will be the first instruction of a next group, and is another branch and wait instruction. If the state of the clock is not as expected by the clock sensing branch instruction, the address portion of the branch instruction will cause the program sequence to return to the instruction which generates the signal on line 61, which instruction precedes, in sequence, the groups of instructions comprised of the branch and wait, sense, and branch instructions.

There has thus been shown, logic used in combination with program sequences of a processor, synchronized by the clocks produced in a file control unit, for sensing the state and proper sequence of clocks and missing clocks. In the absence of an instruction such as branch and wait which provides the synchronization, it would be difficult to synchronize the relatively slow processor to the higher rate of clock and missing clock signals. If the processor clock and file control unit clock were not synchronized in accordance with the invention, it would be possible for clock or missing clocking signals to be generated from the file at a time during the processor cycle when a clock sensing instruction is not being executed. When the processor does execute a sense instruction during its own cycle, the clock signal to be tested may have disappeared, giving erroneous results.

I claim:

1. A signal pattern detector including:
   a source of information comprised of a sequence of signals having first or second binary states;
   timing means associated with said source of information for generating a control clock signal having a predetermined frequency;
   a stored program processor, including a processor clock, having a frequency different from said predetermined frequency, and defining a processor cycle, cycle control means connected to said processor clock for inhibiting or initiating a processor cycle, addressable storage for program instructions, instruction access means normally accessing instructions from said addressable storage in sequence, and instruction decode means for storing instructions accessed from said storage means and providing a function signal identifying an instruction to be executed during said processor cycle, wherein each processor cycle commences with transfer of an instruction to said instruction decode means, and which further includes means, responsive to a first function signal from said instruction decode means, for accessing a second instruction from said addressable storage, and connected to said cycle control means to inhibit commencement of the next processor cycle,
   means connected to said cycle control means and connected and responsive to said control clock signal, for initiating the next processor cycle; and
   signal storage means connected and responsive to said instruction decode means, providing a function signal for said second instruction, for storing and indicating the state of each signal from said source of information.

2. A signal detection circuit in accordance with claim 1 wherein said processor further includes:
   state determining means, connected and responsive to said instruction decode means providing a function signal of a third instruction following in sequence said second instruction, for testing the state of said signal storage means to provide a result signal; and
   access determining means, connected and responsive to said result signal, and connected to said instruction access means for selectively accessing the next instruction in sequence or a further instruction.

3. A signal detection circuit in accordance with claim 2 wherein:
   said state determining means of said processor includes means for testing for a particular state of said signal storage means and for generating either a first or a second result signal;
   said access determining means is responsive to said first signal to access said next instruction in sequence, and responsive to said second result signal to access said further instruction.

4. A signal detection circuit in accordance with claim 3 wherein:
   said addressable storage includes a plurality of groups, including a final group, of said first, second, third, and next instructions in sequence, wherein said next instruction is another of said first instructions, and said further instructions preceeds, in sequential execution, the first of said group of first, second, and third instructions.

5. A signal detection circuit in accordance with claim 4 wherein:
   said source of information includes means for generating a predetermined sequence of and predetermined number of first or second binary states representing signals and missing signals respectively; and
   said plurality of groups of said first, second, and third instructions equal said predetermined number, and each said third instruction tests for a predetermined state in accordance with said predetermined sequence; and
   said next instruction following said third instruction in said final group in said instruction decode means is effective to provide a sequence complete function signal.

6. A signal detection circuit in accordance with claim 5 wherein:
   said source of information includes means for generating a predetermined sequence of signals alternately manifesting clock signals and data signals; and
   said signal storage means is responsive to said clock signals and the second instruction function signal for indicating the presence or absence thereof.

7. A signal detection circuit in accordance with claim 6 wherein there is further included:
   data storage means, connected and responsive to data signals from said source of information for storing the binary state of said sequence of data signals; and
   means, connected and responsive to said sequence complete function signal and said data storage means, for transferring said data signals to utilization means for further processing.

* * * * *